United States Patent Office 3,076,019
Patented Jan. 29, 1963

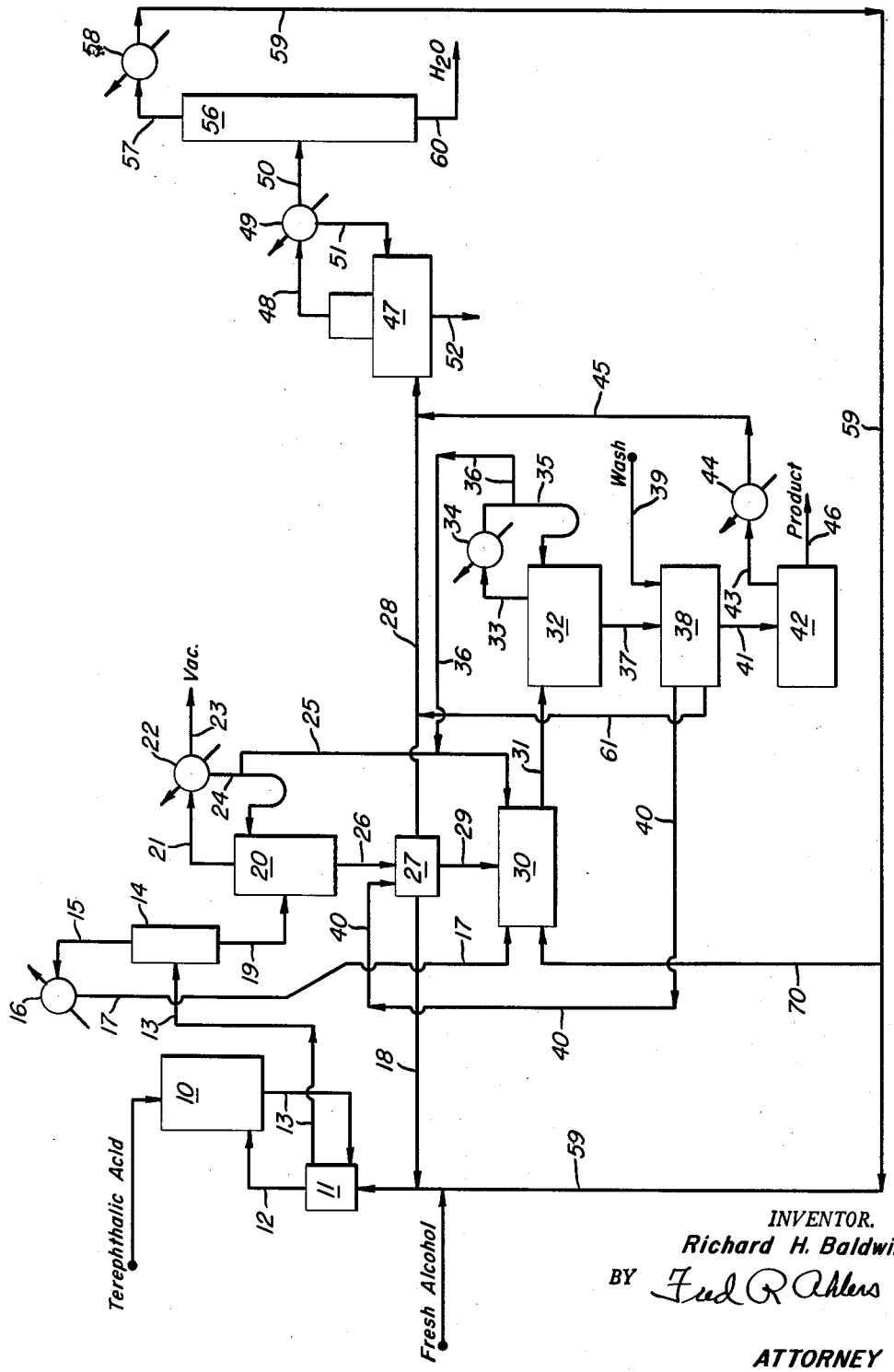

3,076,019
PROCESS FOR PRODUCTION OF DIMETHYL TEREPHTHALATE
Richard H. Baldwin, Oak Lawn, Ill., assignor to Standard Oil Company, Chicago, Ill., a corporation of Indiana
Filed Dec. 21, 1959, Ser. No. 860,850
4 Claims. (Cl. 260—475)

This invention relates to the esterification of terephthalic acid with methanol and more specifically pertains to the production of dimethyl terephthalate of high purity by an integrated process including the steps of esterification, crystallization and recrystallization of the dimethyl ester and the recovery and reuse of unreacted methanol, together with the recycle of methanol containing liquid streams.

The principal use of terephthalic acid is in the preparation of high molecular weight fiber and film-forming cold drawable polyesters which are usually prepared by the polycondensation of a bis (polyol) terephthalate. The bis (polyol) terephthalates are conventionally prepared by a trans-esterification process wherein the polyol is reacted with a lower alkanol diester of terephthalic acid. The trans-esterification process requires the use of extremely high purity dimethyl ester having an acid number (mg. KOH per gram of ester) of 0.1 or less to produce bis (polyol) terephthalates suitable for the preparation of fiber and film-forming polyesters.

The esterification of terephthalic acid is known to be more difficult than the esterification of ortho-phthalic (phthalic) acid. Esterification conditions which are suitable for the esterification of phthalic acid, aliphatic dicarboxylic acids and aliphatic monocarboxylic acids are, in general, not at all useful for the esterification of terephthalic acid. Most of these acids can be esterified in a system employing the acid as a liquid and thus provide good contact between acid and alcohol. However, terephthalic acid remains a solid at the temperatures of esterification and this makes more difficult good contact between the reactants. The esterification of terephthalic acid with methanol is carried out at temperatures above 150° C. and up to 500° C. and at a pressure to maintain the methanol in the liquid phase when liquid phase esterification is preferred. The esterification can be catalytic or non-catalytic. However, in general, the use of an esterification catalyst is preferred, since lower esterification temperatures can be employed and shorter reaction times result when a catalyst is employed.

For the preparation of dimethyl terephthalate, numerous esterification catalysts are available. Such catalysts are strong acids such as sulfuric, hydrochloric and toluene sulfonic acids and metal oxides, metal hydroxides and metal salts such as the chlorides, sulfates and salts of weak acids such as the acetic acid salts or salts of acids weaker than acetic acid. The metal catalysts may be soluble in the esterification reaction mixture; however, they are also useful when dispersed in the reaction mixture. Metals in a finely divided form when dispersed in the reaction mixture may also be employed as catalysts. The hydroxide, oxide or salt of the metal selected as a catalyst is a matter of choice, being selected from the numerous metals whose derivatives have been proposed as catalysts for esterification. The strong acid catalysts are generally avoided in the esterification of terephthalic acid for their presence enhances the formation of ethers at the temperatures of 150° C. and above. Thus, the metal catalysts are most desirable, especially those metals and their derivatives which promote the formation of little or no ether. Useful metal catalysts include zinc oxide, lead oxide, zinc sulfate, lead acetate, antimony oxide, cadmium acetate, zinc acetate, cadmium sulfate, manganous acetate, zinc copper acetate and cobalt acetate, among others.

In general, the processes for preparing dimethyl terephthalate involve esterification of the acid, crystallization of the crude diester from the reaction mixture, purification of the crude diester as by recrystallization from a solvent other than methanol and/or distillation. Purification by recrystallization from a solvent other than methanol, such as recrystallization from xylene, has not been satisfactory for producing dimethyl terephthalate in a purity suitable for use in the trans-esterification and polycondensation processes hereinbefore described. Recrystallization from a solvent other than methanol provides an additional disadvantage in that additional facilities must be provided for a commercial process to recover the solvent in a purified form for reuse. Since the recrystallized diester still contains reaction intermediates, it was found necessary to further purify the diester by distillation.

Dimethyl terephthalate is a high boiling compound and even when subjected to reduced pressure distillation; i.e., at pressures of from 10 to 760 mm. Hg, the distillation temperatures are sufficiently high as to introduce further impurities, possibly by the degradation of the reaction intermediates. These reaction intermediates, mainly mono-methyl esters of terephthalic acid can be recycled to the esterification reaction to complete their conversion to the dimethyl ester. It is readily apparent that the degradation of these recyclable reaction intermediates during distillation represents an additional drawback for commercial operation.

Also, in the conventional esterification of terephthalic acid a slurry of the acid and methanol is prepared as the feed mixture for the reactor. It has also been proposed to preheat this mixture before it flows into the reactor, especially in a continuous esterification process. The difficulties encountered in pumping under pressures of up to 2,000 p.s.i.g. and above such slurries of methanol and solid acid to be esterified, as well as the problems involved in preheating such slurries, are readily apparent to those skilled in the art.

An improved process has been discovered for the preparation of dimethyl terephthalate as a highly pure product in a batch or continuous manner which eliminates the problems of pumping and heating a slurry under high pressure, subjecting esterification intermediates to temperatures higher than esterification temperatures with possible degradation of the intermediates and the recycling of excessive amounts of water produced by esterification. These improvements are provided by preheating methanol under elevated pressure, preferably to the reaction temperature and pressure, combining in the esterification reactor the preheated methanol and terephthalic acid, preferably hot terephthalic acid, desirably in the range of 120° to 175° C. The esterification is then carried out at temperatures above 150° C., generally in the range 190 to 350° C. with corresponding pressures to maintain the methanol in the liquid phase, pressures in the range of 500 to 5000 p.s.i.g. being suitable. The reactor effluent (esterification reaction mixture) is discharged to a lower pressure, preferably with removal and recovery of the methanol vapors. Such lower pressures as in the range of one to four atmospheres absolute being useful to remove methanol rich vapors; i.e., containing 5% or less water, which can be collected as by condensing and recycling the condensate to the esterification reaction, or preferably by combining with other recycle methanol condensate streams for use in a subsequent dissolving step. The flash cooling is preferably carried out at temperatures where there is formed dimethyl terephthalate nuclei or seed crystal precipitates. The amount of methanol removed from the esterification reaction mixture can be varied; however, the amount remaining should be sufficient to provide at least a pumpable slurry; i.e., not more than about 15 to 30% solids, desirably a flowable slurry, not more than 15% solids and preferably 5 to 10% solids. Hence, the range of methanol is to provide a slurry of 5 to 30% solids. The resulting mixture which has been cooled by flashing off methanol is then crystallized at a pressure below that of flash cooling such as in the range of 50 to 760 mm. Hg and preferably 100 to 400 mm. Hg to cool rapidly and form large crystals. The methanol removed during this low pressure crystallization may be employed in a subsequent step. In this crystallization step a maximum amount of the desired dimethyl ester is crystallized. The crystallized diester is recovered by phase separation as by filtration, centrifugation, decantation and the like. The mother liquor is collected and the methanol recovered therefrom. The solids recovered are washed as hereinafter provided.

The washed solid crude dimethyl ester is redissolved in fresh methanol or preferably in the methanol condensate streams removed from the various crystallizations. Sufficient methanol is employed to maintain substantially all of the acidic impurities, mainly the monomethyl esters, in solution when the final purified diester is recrystallized. This redissolving is conveniently carried out employing from 1 to 5 parts methanol by weight per part of dimethyl ester by weight. The recrystallization step can be carried out at atmospheric pressure or below, say above 50 mm. Hg, and is preferably carried out at 100 to 400 mm. Hg. Methanol may be removed by vaporization during the low pressure cooling and may be recycled to the esterification or the prior redissolving step. The recrystallized dimethyl ester is recovered by phase separation as by filtration, centrifugation or decantation. The mother liquor is charged to a methanol recovery system. The recovered recrystallized dimethyl ester is washed with fresh methanol or methanol recovered from the mother liquor of the first crystallization, which methanol has been dehydrated, at the rate of 0.5 to 1.0 part per part of dimethyl ester. The washed recrystallized dimethyl ester when dried at a temperature above the boiling point of methanol up to about 100° C., preferably in the range of from 60 to 75° C., will have an acid number of 0.1 or below.

The wash liquor from recovery of recrystallized diester is then used to wash the crude crystalline dimethyl ester recovered from the first crystallization, thus providing a countercurrent system for washing the various crystallized products with the purest product being washed with high purity methanol to remove or displace mainly the adhering mother liquor from the product of the recrystallization step and this wash liquor being used to wash the crude first crystallized diester. The wash liquor from the washing of the first crystallized crude dimethyl ester may be charged to methanol recovery or is preferably added to the various methanol streams making up the methanol to be preheated and charged to the reactor.

The methanol in the mother liquor from the first crystallization and separation step is preferably recovered by distilling wet methanol therefrom. The solids in the still bottoms are maintained as a melt to facilitate removal. The wet methanol is then fractionated to recover a dried methanol containing less than 5% water and preferably 0 to about 2% water. The solids in the distillation bottoms are removed and the solids are charged to the esterification reactor with a minor amount, less than 50%, being purged to prevent excessive build up of esterification by-products, such as dimethyl isophthalate. Recycle of these bottoms reduces build up of the mono-methyl terephthalate.

The above-described process eliminates the need for distillation of the dimethyl ester product and removes substantially all of the esterification intermediates which might otherwise be associated with the crude dimethyl ester usually purified by distillation at temperatures at which degradation products, especially of the intermediates, are likely to form. Although the process of this invention is applicable to the use of terephthalic acid and mixtures thereof with isophthalic acid, for practical purposes it is desirable that the acid being esterified contain no more than about 5% by weight of isophthalic acid and preferably 1.0% or less. For example, when dimethyl terephthalate is the desired product, the amount of methanol employed to maintain all of the dimethyl isophthalate in solution becomes unrealistically great for commercial practice when the isophthalic acid content of the terephthalic acid is more than 5% by weight. However, for such greater amounts of isophthalic acid two or more dissolving and recrystallizations will provide a final product of high purity. When the terephthalic acid contains 5% or less of isophthalic acid, one or two recrystallization steps with, of course, the countercurrent washing of the separated crystallized diester will result in a product of high purity. For the use of terephthalic acid of 1% or less of isophthalic acid and little or no other esterifiable impurities, the process as illustrated in the accompanying drawing having only one recrystallization step can produce a dimethyl ester product of high purity. The use of terephthalic acid containing 1% or less of isophthalic acid in the esterification results in a first crystallized crude product where substantially the only impurity is the monomethyl terephthalate because the quantity of methanol present in the first crystallization step maintains most of the isophthalic acid ester impurities in solution. It is, therefore, preferred for the process of this invention to employ as the terephthalic acid being esterified one which contains 0 to 1% of isophthalic acid.

For the purposes of this invention the esterification is carried out with from 2 to 20 parts (10 to 100 mols) and preferably about 3 to 6 parts (15 to 30 mols) of methanol per part (or mol) of terephthalic acid with or without an esterification catalyst. Esterification temperatures above 150° C. may be employed with the desirable range being 190 to 350° C. and the preferred range being 235 to 285° C. when a catalyst is employed. The preferred range when no catalyst is employed is somewhat higher, 250 to 300° C. Although strong acid catalysts may be employed, they are not as desirable because of the tendency of excessive ether formation thus unnecessarily consuming methanol in a non-ester product. Preferred as catalysts, when one is used, are the metal catalysts hereinbefore disclosed. In general, these metal catalysts can be used in an amount above 0.01% by weight based on the acid being esterified. More than 2.0% catalyst can be used but, in general, 0.025 to 0.5% by weight will provide substantial esterification equilibrium conditions, 95 to 98% esterification of available carboxyl groups, in useful reaction times of 15 to 90 minutes. Since in the early portion of the reaction the reaction rate is dependent upon contact between liquid methanol and solid acid, the slurry should be kept in uniform suspension which can be accomplished by maintaining suitable flow characteristics of the slurry, at least turbulent flow, or by providing stirring. The preferred proportions of methanol to acid being esterified provide slurries of 15 to 25% solids content which can be readily maintained in uniform dispersion. Such dispersions need only be maintained for the first 25 to 40% of the reaction time for thereafter the reaction mixture is a solution primarily of mono-methyl ester in methanol.

The process of this invention will be illustrated with respect to the esterification of terephthalic acid containing about one percent by weight isophthalic acid with methanol and with respect to the accompanying schematic flow drawing. All "part" or "parts" are by weight.

To reactor 10 containing an esterification reaction mixture there are fed continuously 1000 parts per hour of terephthalic acid containing 1.0% isophthalic acid from a source of terephthalic acid at 150° C. Catalyst in the amount of 0.5 part per hour are added to reactor 10. Also, to reactor 10 there is fed through line 12 continuously a methanol mixture preheated to 260° C. and 1900 p.s.i.g. in preheater 11 containing per hour 5000 parts methanol, 100 parts water, 2 parts monomethyl terephthalate, trace of dimethyl isophthalate, and 18 parts dimethyl terephthalate. The heat to preheater 11 is supplied by the esterification product in line 13 from reactor 10 flowing in indirect heat exchange relationship to said methanol feed. The reaction mixture in reactor 10 has been prepared by reacting at 260° C. and 1900 p.s.i.g. terephthalic acid containing 1% isophthalic acid, methanol and catalyst in the same proportions for about 30 minutes before continuous feed is begun. The methanol feed is a combination of recycled dehydrated methanol recovered in methanol fractionator 56 and flowing in line 59 and wash liquor in line 18 from solid separator 27. Methanol condensate from line 17 when containing less than 2% water may be added to the reactor, otherwise this condensate is combined with condensate from condensers 22 and/or 34 and added to dissolver 30.

The esterification reaction mixture from reactor 10 is withdrawn through line 13 and cooled to 120° C. in a heat exchanger, preferably feed product interchanger 11 using methanol feed in line 12 for cooling. The cooled esterification reaction mixture is charged to flash cooler 14 wherein 460 parts per hour of methanol containing about 2% water are removed through line 15, condensed in condenser 16 and the condensate combined with condensate streams from condensers 22 and 34. In flash cooler 14 the pressure of the reaction mixture is reduced to 0 to 50 p.s.i.g. and the mixture is cooled to 65–105° C. On an hourly basis there are charged to crystallizer 20, 5660 parts of cooled product containing 4158 parts methanol, 320 parts water, 1068 parts dimethyl terephthalate, 102 parts monomethyl terephthalate and 12 parts dimethyl isophthalate. In flash cooler 14 seed crystals of dimethyl terephthalate are formed with substantially no precipitation of crystalline dimethyl terephthalate. The resulting cooled mixture flows through line 19 to crystallizer 20, preferably operated at 150 to 170 mm. Hg, wherein dimethyl terephthalate is crystallized rapidly at about 25 to 30° C. with removal of about 1000 parts per hour of wet methanol (8% water) through line 25. Substantially all of the reaction intermediates remain in solution. The crystallized solids are recovered by phase separation in separator 27 which can be a filter, centrifuge, decanter and the like. The mother liquor, 3439 parts, containing: 3058 parts methanol, 236 parts water, 34 parts dimethyl terephthalate, 99 parts monomethyl terephthalate and 12 parts dimethyl isophthalate, flows through line 28 to wet methanol stripper 47. The solids recovered in separator 27 are washed with 1210 parts of the wash liquor from separator 38 containing on an hourly basis 1176 parts methanol, 24 parts water, 9 parts dimethyl terephthalate and 1.0 part monomethyl terephthalate. The resulting wash liquors, 1220 parts, flow through line 18 to make up the methanol charged to reactor 10 and contain on an hourly basis 1176 parts methanol, 24 parts water, 18 parts dimethyl terephthalate and 2 parts monomethyl terephthalate.

The wet solids, 1211.5 parts per hour, contain 2 parts monomethyl ester, 1025 parts dimethyl terephthalate, 0.5 part catalyst, 180 parts methanol, and 4 parts water, flow through line 29 to dissolver 30 and are combined with the wet methanol, 1000 parts (8% water), from crystallizer 20 removed therefrom as vapors through line 21, condensed in condenser 22 to which a source of vacuum is connected through line 23. A portion of the condensate recycles to crystallizer 20 to maintain a sufficient amount of methanol to keep a substantial portion of the intermediates in solution. As additional methanol to dissolve the wet crystalline diester, there is added through lines 36 and 25, 1000 parts wet methanol (8% water) removed from crystallizer 32, the condensate from line 17, and 1540 parts of recycled dehydrated methanol (2% water) taken from line 59 through line 70. The total methanol employed for dissolving the crude diester is 4000 parts containing 200 parts water. The dissolving is carried out at a temperature of 65 to 95° C. and 0 to 50 p.s.i.g. The resulting solution is cooled at reduced pressure, below 760 mm. Hg and preferably at 150 to 170 mm. Hg, again removing 1000 parts methanol vapors containing 8% water. The vaporized methanol is removed through line 33, condensed in condenser 34, a portion returned to crystallizer 32 and the remainder, said 1000 parts per hour, charged to dissolver 30. The amount of methanol returned to the crystallizer need only be an amount sufficient to keep the remaining intermediates in solution at the crystallization temperature which will be in the range of from 25 to 30° C.

The resulting slurry, 4210 parts per hour, flows through line 37 to solids separator 38 which may be the same as solids separator 27. The separated mother liquor, 3084 parts per hour, containing 121 parts water, 2936 parts methanol, 26 parts dimethyl terephthalate and 1.0 part monomethyl terephthalate, flows through line 61 to wet methanol stripper 47. The solids recovered in separator 38 are washed with 1200 parts fresh recovered dehydrated methanol (2% water) through line 39. The wash liquor flows from solids separator 38 through line 40 to wash the solids recovered in separator 27. The wet washed recrystallized solids are removed through line 41 to drier 42 where the wet solid is dried at about 65° C. The wet methanol vapors, 127 parts per hour, containing 3 parts water per hour are removed from the drier through line 43, condensed in condenser 44 and the condensate taken through line 45 to wet methanol stripper 47. In wet methanol stripper 47 mother liquor from separators 27 and 28 and condensate from line 45 are heated at 230–235° C. to remove wet methanol vapors which are withdrawn through line 48 to condenser 49. The combined feed to wet methanol stripper 47 is 6650 parts per hour containing 6118 parts methanol, 360 parts water, 60 parts dimethyl terephthalate, 100 parts monomethyl terephthalate and 12 parts dimethyl isophthalate. A portion of the condensate is returned to wet methanol stripper 47 through line 51 and the remainder is fed through line 50 to methanol fractionator 56. The molten bottoms from stripper 47 are withdrawn at 172.5 parts per hour therefrom through line 52 at 145 to 150° C. and contain 60 parts dimethyl terephthalate, 100 parts monomethyl terephthalate, 0.5 part catalyst, and 12 parts dimethyl isophthalate. The dehydrated methanol, 6248 parts per hour (130 parts water), obtained from fractionator 56 through line 57, condenser 58 and recycle line 59, less the amount withdrawn as wash for separator 38 and charged to dissolver 30, are combined with 392 parts fresh methanol per hour and wash liquor from line 18 and preheated to make up the charge to reactor 10.

By this process a yield of dimethyl terephthalate of 990 parts per hour having a purity of 99.9+ mol percent (freezing point 140.6° C.) is obtained. Such a product is acceptable for trans-esterification with ethylene glycol.

What is claimed is:

1. A continuous process for producing dimethyl terephthalate containing no more than 0.10 mol percent impurity comprising continuously preheating methanol feed containing no more than 2 percent water by weight to a temperature of 260° C. and 1900 p.s.i.g., continuously charging 5 parts of preheated methanol per part of said terephthalic acid at 150° C. to an esterification zone containing an esterification reaction mixture resulting from the reaction of said proportions of methanol and terephthalic acid at 260° C. and 1900 p.s.i.g., continuously withdrawing a portion of the esterification reaction mixture at a rate to provide about 30 minutes residence in said esterification zone, continuously contacting said withdrawn portion of the esterification reaction mixture in indirect heat exchange relationship with said feed methanol to cool said portion of the esterification reaction mixture to 120° C. and to accomplish said preheating of feed methanol, continuously flash cooling the 120° C. portion of said esterification reaction mixture to 65 to 105° C. at 0 to 50 p.s.i.g. while removing a first web methanol and nucleating seed crystals of crude dimethyl terephthalate, continuously cooling said mixture in a first crystallization zone rapidly at 100 to 400 mm. Hg and 25 to 35° C. to grow large crystals of crude dimethyl terephthalate while removing a second wet methanol, continuously separating said crude dimethyl terephthalate crystals from the mother liquor, continuously washing said crude dimethyl terephthalate crystals with a methanol wash hereinafter provided by the washing of recrystallized dimethyl terephthalate, redissolving said washed crude dimethyl terephthalate at 65 to 105° C. and 0 to 50 p.s.i.g. in methanol comprising (a) said first and second portions of wet methanol removed in the prior cooling steps, (b) a third portion of wet methanol hereinafter obtained in a second crystallization zone and (c) dehydrated recycle methanol to provide a total of 5 parts of methanol per part of crude dimethyl terephthalate by weight, continuously cooling said solution in a second recrystallization zone at 100 to 400 mm. Hg and 25 to 35° C. to recrystallize dimethyl terephthalate, continuously separating recrystallized dimethyl terephthalate from its mother liquor, continuously washing the recrystallized dimethyl terephthalate with equal parts by weight of dehydrated methanol and charging the wash liquor to wash the crude dimethyl terephthalate crystals, continuously drying said washed recrystallized dimethyl terephthalate.

2. A process for preparing dimethyl terephthalate containing no more than 0.1 mole percent impurity which comprises reacting terephthalic acid containing less than 5% isophthalic acid by weight with methanol in a weight ratio of from 1 to 2 up to 1 to 20 at a temperature in the range of from 190 to 350° C. at a pressure to maintain a liquid phase to produce an esterification reaction mixture, flash cooling said reaction mixture at a pressure in the range of 0 to 50 p.s.i.g. while removing methanol rich vapors containing no more than 5% water leaving a weight ratio of from 1 to 1 up to 5 to 1 of methanol based on the dimethyl terephthalate, cooling to a temperature below 65° C. the flash cooled reaction mixture at a pressure in the range of from 50 to 760 mm. Hg, separating crude crystalline dimethyl terephthalate product from the mother liquor, washing the crude dimethyl terephthalate with the wash liquor from the hereinafter washed recrystallized dimethyl terephthalate, redissolving said crude dimethyl terephthalate in methanol containing no more than 5% water recovered from the flash cooling steps, recrystallizing dimethyl terephthalate from said solution and removing methanol therefrom for recycle to the step of dissolving crude dimethyl terephthalate at a pressure of 760 to 100 mm. Hg leaving the minimum methanol to maintain monomethyl ester of terephthalic acid in solution, separating recrystallized solid dimethyl terephthalate from the solution of said monomethyl ester, washing the recrystallized dimethyl terephthalate with methanol, and drying the washed recrysallized dimethyl terephthalate whereby the dry dimethyl terephthalate contains no more than 0.10 mole percent impurity.

3. The process of claim 2 wherein the methanol employed to wash the crude dimethyl terephthalate is obtained by stripping wet methanol from the mother liquor obtained by the recovery of crude dimethyl terephthalate and dehydrating said wet methanol.

4. A process for preparing dimethyl terephthalate containing no more than 0.10 mole percent impurity which comprises reacting terephthalic acid containing 1.0% isophthalic acid by weight with methanol in a weight ratio of from 1 to 3 up to 1 to 6 at a temperature in the range of 190 to 350° C. at a pressure to maintain a liquid phase to produce an esterification reaction mixture, flash cooling said reaction mixture to a temperature in the range of from 65 to 105° C. and a pressure of 0 to 50 p.s.i.g. while removing methanol rich vapors containing 2% water leaving a weight ratio of from 1 to 1 up to 5 to 1 of methanol based on the dimethyl terephthalate, cooling the mixture resulting from flash cooling to a temperature in the range of 25 to 30° C. at a pressure in the range of 150 to 170 mm. Hg while removing wet methanol containing 8% water, separating crude crystallized dimethyl terephthalate product from the mother liquor, washing the crude solid dimethyl terephthalate with wash liquor from the hereinafter washed recrystallized dimethyl terephthalate, redissolving said washed crude dimethyl terephthalate in wet methanol obtained from said flash cooling and said crystallization of crude dimethyl terephthalate, and from a wet methanol hereinafter removed from the step of recrystallizing dimethyl terephthalate together with the sufficient additional methanol to provide a total of from 1 to 5 parts of methanol per part of crude dimethyl terephthalate by weight, carrying out said dissolving of crude dimethyl terephthalate at 65 to 105° C. and 0 to 50 p.s.i.g., cooling said solution of redissolved dimethyl terephthalate at a pressure of from 150 to 170 mm. Hg while removing wet methanol containing 8% water to recrystallize dimethyl terephthalate, separating the solid recrystallized dimethyl terephthalate product from the mother liquor, washing the solid recrystallized dimethyl terephthalate with methanol, and drying the washed recrystallized dimethyl terephthalate whereby the dry dimethyl terephthalate contains no more than 0.10 mole percent impurity.

References Cited in the file of this patent

UNITED STATES PATENTS 2,802,861     Van Dijk et al. _____ Aug. 13, 1957

OTHER REFERENCES

Weissberger: Separation and Purification, Part I, vol. III, 2nd ed., pp. 485–496 (1956).